United States Patent
Begli et al.

(10) Patent No.: US 8,329,613 B2
(45) Date of Patent: Dec. 11, 2012

(54) SUPPORTED GOLD CATALYST

(75) Inventors: Alireza Haji Begli, Ramsen (DE);
Christine Baatz, Worms (DE); Nadine Decker, Braunschweig (DE); Ulf Pruesse, Braunschweig (DE); Klaus-Dieter Vorlop, Braunschweig (DE)

(73) Assignee: Südzucker Aktiengesellschaft Mannheim/Ochsenfurt, Mannheim (DE)

( * ) Notice: Subject to any disclaimer, the term of this patent is extended or adjusted under 35 U.S.C. 154(b) by 788 days.

(21) Appl. No.: 11/997,594

(22) PCT Filed: Aug. 1, 2006

(86) PCT No.: PCT/EP2006/007584
§ 371 (c)(1),
(2), (4) Date: Jul. 2, 2008

(87) PCT Pub. No.: WO2007/017157
PCT Pub. Date: Feb. 15, 2007

(65) Prior Publication Data
US 2009/0221849 A1    Sep. 3, 2009

(30) Foreign Application Priority Data
Aug. 5, 2005 (DE) .................. 10 2005 036 890

(51) Int. Cl.
B01J 23/44 (2006.01)
(52) U.S. Cl. .................................................. 502/344
(58) Field of Classification Search .................. None
See application file for complete search history.

(56) References Cited

U.S. PATENT DOCUMENTS

| | | | |
|---|---|---|---|
| 4,839,327 A * | 6/1989 | Haruta et al. ............... 502/243 |
| 6,987,200 B2 | 1/2006 | Hagemeyer et al. | |
| 2004/0176620 A1* | 9/2004 | Kuperman et al. ........... 549/533 |
| 2007/0027341 A1 | 2/2007 | Rossi et al. | |
| 2007/0112186 A1 | 5/2007 | Kowalczyk et al. | |

FOREIGN PATENT DOCUMENTS

| | | |
|---|---|---|
| DE | 19734974 | 2/1999 |
| DE | 10319917 | 12/2004 |
| GB | 2408956 * | 6/2005 |
| JP | 2005154302 A | 6/2005 |
| WO | 03068389 | 8/2003 |
| WO | WO-2005003072 | 1/2005 |

OTHER PUBLICATIONS

Prati et al., Journal of Catalysts 176, 552-560 (1998).*
Berndt et al., Applied Catalysts 244 (1), 2003, pp. 169-179.*
Prati, L. et al. "Gold on carbon as a new catalyst for selective liquid phase oxidation of diols" Journal of catalysts. vol. 176, No. 2. Jun. 10, 1998. pp. 552-560.

(Continued)

Primary Examiner — Karl J Puttlitz
(74) Attorney, Agent, or Firm — Fish & Richardson P.C.

(57) ABSTRACT

The invention relates to methods for producing supported gold catalysts from a porous metal oxide support and a chloroauric acid precursor, wherein the support is placed in contact with the aqueous solution of the chloroauric acid precursor. The invention also relates to a metal oxide supported gold catalyst and its use in the oxidation of alcohols, aldehydes, polyhydroxy compounds and carbohydrates.

9 Claims, 2 Drawing Sheets

OTHER PUBLICATIONS

Berndt, H. et al. "Oxygen adsorption on Au/Al2O3 catalysts and relation to the catalytic oxidation of ethylene glycol to glycolic acid" Applied catalysis A: General. vol. 244, No. 1, May 8, 2003. pp. 169-179.

Zanella, R. et al. "Alternative methods for the preparation of gold nanoparticles supported on TiO2" J. Phys. Chem. B. vol. 106, Jul. 13, 2002. pp. 7634-7642.

Japanese Office Action for Application No. 2008-524420 dated Aug. 2, 2011.

Eggleston et al., "Cytochrome c interaction with hematite (a-Fe2O3) surfaces", Journal of Electron Spectroscopy and Related Phenomena 150 (2006) 220-227.

Bahena et al., "Fluoride Adsorption onto a-Al2O3 and its Effect on the Zeta Potential at the Alumina-Aqueous Electrolyte Interface", Separation Science and Technology, 37(8), 1973-1987 (2002).

* cited by examiner

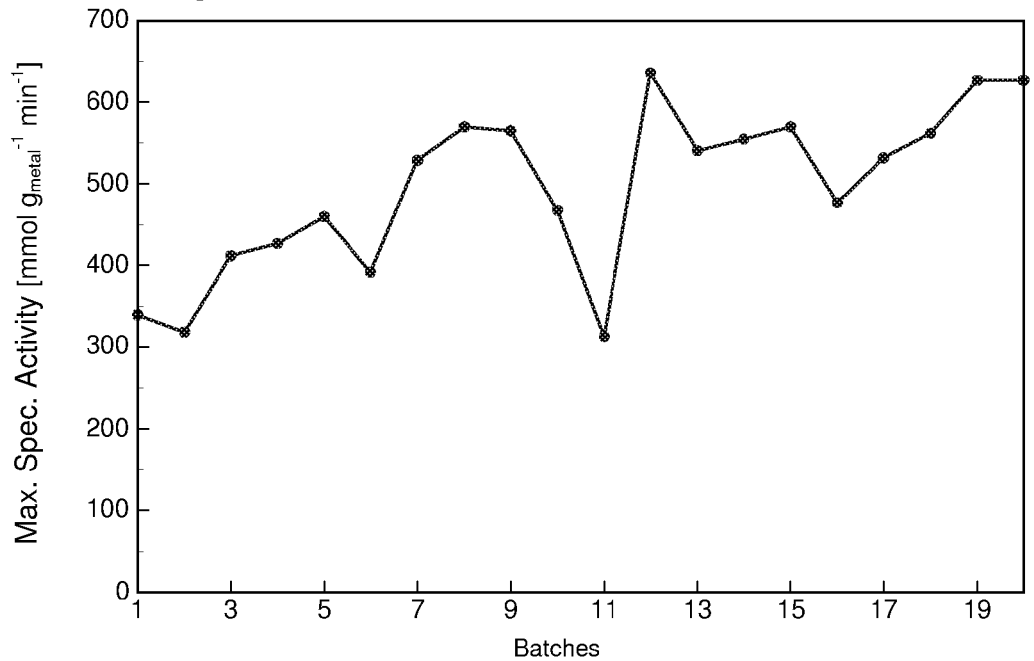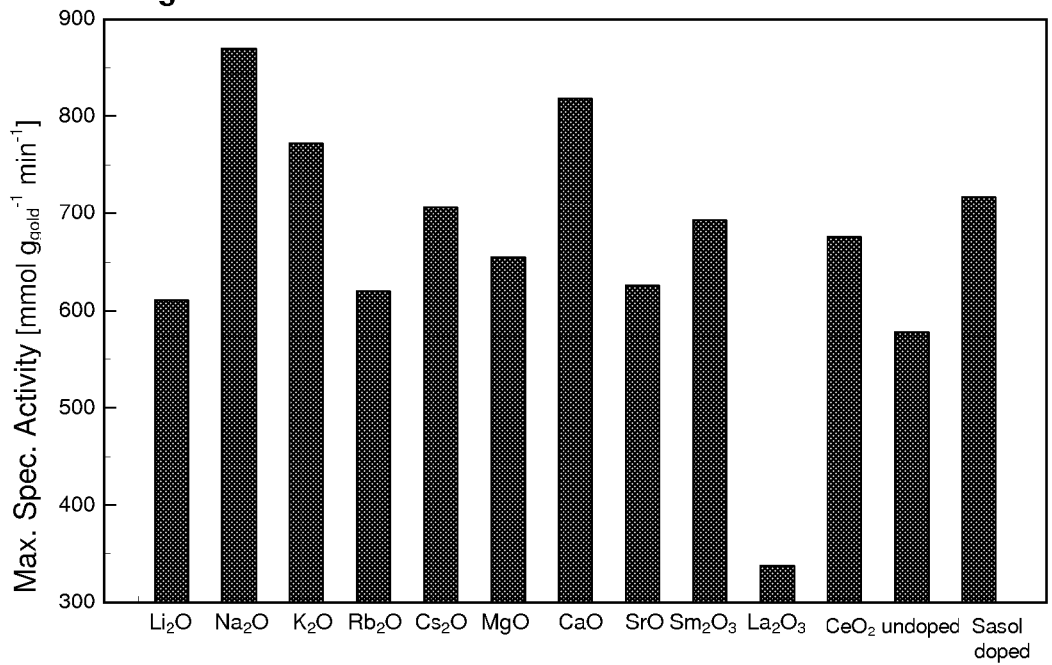

SUPPORTED GOLD CATALYST

This application is a U.S. national phase application under 35 U.S.C. §371 of International Patent Application No. PCT/EP2006/007584 filed Aug. 1, 2006, which claims the benefit of priority to German Patent Application No. DE 10 2005 036 890.5 filed Aug. 5, 2005, the disclosures of all of which are hereby incorporated by reference in their entireties. The International Application was published in German on Feb. 15, 2007 as WO 2007/017157.

FIELD OF THE INVENTION

The invention relates to methods for producing supported gold catalysts from a porous metal oxide support and a chloroauric acid precursor, wherein the support is placed in contact with the aqueous solution of the chloroauric acid precursor. The invention also relates to a metal oxide supported gold catalyst and its use in the oxidation of alcohols, aldehydes, polyhydroxy compounds and carbohydrates.

BACKGROUND

There is a common need for highly active and stable catalysts that can be used especially in the oxidation of organic compounds such as alcohols, aldehydes, polyhydroxy compounds and mono-, oligo- and polysaccharides.

The use of supported palladium and platinum catalysts in the oxidation of glucose is known. However, this is severely limited due to the low selectivity and the low conversion rate. In addition, the catalysts are deactivated relatively rapidly as a result of a blocking of the catalyst surface due to absorption and/or due to poisoning effects.

Thus, for the commercial production of oxidation products from carbohydrates, it continues to be necessary to use fermentation processes, which are associated with high equipment expenditure and with waste water loads.

For this reason, it is necessary for new catalyst types to be developed, which will enable effective catalytic oxidation, especially of carbohydrates, for example for the production of aldonic acids using dioxygen as the oxidation agent, and which, in addition to high activity and selectivity, will have a long lifespan.

Supported gold catalysts are also known. They are used primarily in the oxidation of CO or propene in the gas phase, and for selective hydrations. Carbon-supported gold catalysts can also be used for the selective oxidation of D-glucose to D-gluconic acid in the liquid phase. Supported gold catalysts with nanodisperse distributed gold particles on carbon or metal oxide supports are also known from DE 10319917 A1. These are used primarily for the C1 selective oxidation of glucose and other carbohydrates. The activity level of these catalysts, however, is not satisfactory.

Methods for producing gold catalysts by impregnation of the support using the "incipient wetness method" are known. However, in the literature such impregnation methods are described as unsuitable for the synthesis of active gold catalysts. This is because generally these methods produce only gold particles that are too large (greater than 10 nm).

DESCRIPTION OF THE INVENTION

The present invention is therefore based essentially upon the technical problem of providing improved supported gold catalysts and methods for producing them, which demonstrate improved activity, especially in the oxidation of organic compounds such as alcohols, aldehydes and polyhydroxy compounds.

The invention is further based upon the problem of producing a method for the selective and effective oxidation of carbohydrates, especially for the production of aldonic acids, which will overcome the disadvantages of the prior art.

The technical problem of the invention is solved by providing a method for producing a supported gold catalyst from a porous metal oxide support and a chloroauric acid precursor, wherein in a step a) the metal oxide support is prepared, in a step b) the support is placed in contact with an aqueous solution of the chloroauric acid precursor. In step b) an impregnated catalyst precursor is thereby obtained, which is dried in a subsequent step c). The method according to the invention is characterized especially in that in step a) the support is provided in dried and preferably pulverized or granulated form, or as a molded article, and in that in step b) the maximum volume of the aqueous solution of the chloroauric acid precursor is chosen to be great enough that it corresponds to the pore volume of the support. It can be chosen to be smaller, but not greater than the pore volume.

If the specific pore volume of the support is not known, the volume of aqueous precursor solution that is added to the dry support is preferably determined empirically, by adding precursor solution gradually to the dry support, until the support is unable to absorb any further volume of precursor solution. This can be identified especially in the onset of a moist appearance of the support material. For each type of metal oxide support a specific absorption capacity [in ml/$g_{catalyst\ support}$] results, which is based especially upon the surface/volume ratio, the pore size, and the degree of dryness of the metal oxide support. "Dry" refers to the fact that the porous metal oxide support contains essentially no moisture in the pore volume, so that precursor solution can be absorbed into the pore volume.

In one particularly preferred variant, steps a) through c) are performed multiple times, in other words at least twice, in sequence. In an alternative variant, steps b) and c) are performed simultaneously, in other words in parallel.

In one preferred embodiment, in step b) the metal oxide support is placed in contact with the chloroauric acid precursor by adding the precursor to the support dropwise, under stirring. In one preferred variant, the precursor is sprayed onto the support, wherein the support is preferably stirred. The support with the applied precursor is preferably dried (step c)) during stirring. In one variant, the precursor is placed in contact with the support in a coating pan or a pelletier plate, wherein it is preferably added dropwise or sprayed on, and is optionally dried simultaneously. In a further variant, the support is located in a fluidized bed, and the precursor is added to the fluidized bed, preferably being sprayed in; in this case, the support is preferably dried with the applied precursor (step c)).

A solution of tetrachloroauric acid ($HAuCl_4$) in aqueous acid, especially hydrochloric acid, is preferably used as the aqueous solution of the chloroauric acid precursor, wherein preferably the concentration of the acid amounts to 0.1 mol/l to 12 mol/l, preferably from 1 mol/l to 4 mmol/l, especially preferably 2 mol/l. In one particularly preferred embodiment, the pH level of the finished precursor solution is always 1 or less. Preferably or optionally—depending upon the application—the precursor solution used according to the invention contains at least one additional acid. Of course, other inorganic or organic acids can be used in place of the hydrochloric acid.

Particularly preferably, to produce the aqueous precursor solution, the necessary quantity of tetrachloroauric acid is weighed and dissolved directly in the aqueous acid. Aqueous hydrochloric acid is preferably used to dissolve the tetrachloroauric acid, preferably in a concentration of 0.1 mol/l to 12 mol/l, 1 mol/l to 4 mol/l and especially preferably 2 mol/l.

Transmission Electron Microscopy (TEM) measurements have shown that the catalysts produced according to the invention surprisingly have very small and active particle sizes of less than 10 nm, especially from 1 nm to 10 nm, preferably from 1 nm to 9 nm, especially from 1 nm to 5 nm or even from 1 nm to 2 nm. With the process of the invention, the inventors have succeeded for the first time in preparing catalytically active gold particles in sizes of significantly less than 10 nm using the "incipient wetness" method. These discoveries are surprising and are contradictory to the descriptions contained in the pertinent literature. The gold catalysts obtained demonstrate a level of activity that has never before been achieved, for example in the conversion of glucose.

Especially by using a highly acid precursor solution (for example 2 mol/l HCl as a solvent for tetrachloroauric acid) and by using porous aluminum oxide, such as Puralox KR-90, as the support material, the most active gold catalyst for glucose oxidation thus far was successfully prepared. A catalyst produced according to the invention has an activity level of up to 2,200 mmol $g_{metal}^{-1}$ min$^{-1}$. This represents an approximately quadruple increase in relation to the gold catalysts known in the prior art.

$HAuCl_4$ is not stable in an aqueous solution, and is instead hydrolyzed. With a plurality of equilibrium levels established in sequence, a successive exchange of the chloride for water and hydroxyl groups occurs: $[AuCl_4]^-$, $[AuCl_3(OH)]^-$, $[AuCl_2(OH)_2]^-$, $[AuCl_2(OH)]$, $[AuCl(OH)_2]$, $[Au(OH)_3]$, $[Au(OH)_4]^-$. These equilibrium levels are time- and pH-dependent. Hydrolysis can be prevented with a sufficiently low pH value.

Without being tied to theory, in a highly acid aqueous solution (2 mol/l HCl) the tetrachloro complex $[AuCl_4]^-$ dominates. The presence of this complex surprisingly leads to the stabilization of very small particles, especially in the reduction of the catalyst precursor. In other, less acid solutions, a gradual, successive exchange of the chloride ions for water and hydroxide ions probably occurs.

Preferably, metal oxides such as aluminum oxide, titanium dioxide or silicon oxide are used as the support. Especially preferably, aluminum oxide ($Al_2O_3$), for example Puralox SCFa-90 or Puralox KR-90, is used.

Preferably, in step c) drying is performed at temperatures greater than or equal to room temperature, preferably from 60° C. to 200° C., especially preferably from 60° C. to 100° C.

Preferably, in an additional step d), which is preferably implemented following step c), the catalyst precursor is reduced. This preferably occurs in a hydrogen stream. The hydrogen stream preferably has a hydrogen content of 5 vol.-% to 15 vol.-%, preferably 10 vol.-%. Depending upon the application, the hydrogen stream can optionally contain at least one inert gas, such as nitrogen or noble gas. Especially preferably, the hydrogen stream is comprised of hydrogen gas and at least one inert gas. Alternatively, the reduction can be performed as a liquid phase reduction in a manner known in the art, using suitable reduction agents such as sodium hydridoborate, formate salts, carbohydrates, formaldehyde or hydrazine.

If, in a preferred embodiment of the process of the invention, steps a) through c), especially steps b) and c), are performed multiple times in sequence, it is preferably provided that, intermediately, preferably following each sequence of steps a) through c), especially b) and c), the catalyst precursor is reduced (step d).

Preferably, the reduction in step d) is performed at temperatures greater than or equal to 250° C. According to the invention, the reduction occurs in 10 minutes to 300 minutes, preferably from 80 to 120 minutes.

According to the invention, it is also provided that at least one doping agent can be added to the support and/or the aqueous solution of the chloroauric acid precursor. This agent is preferably selected from oxides of alkali metals, alkaline earth metals, and rare earth metals. Doping agents with sodium, potassium, cesium, calcium, cerium and/or samarium are especially preferred. Preferably, the at least one doping agent is added in an amount of 0.01 wt.-% to 1 wt.-%.

Accordingly, a further object of the present invention is the use of a chloroauric acid precursor that contains or consists of a solution or suspension of tetrachloroauric acid ($HAuCl_4$) in a solvent, wherein the solvent is aqueous acid in a concentration of 0.1 mol/l to 12 mol/l, preferably 1 mol/l to 4 mol/l, especially preferably 2 mol/l. The acid is preferably hydrochloric acid (HCl). Preferably, the hydrochloric acid is optionally present in combination with at least one additional acid. According to the invention, this chloroauric acid precursor is used to produce a metal oxide supported gold catalyst, preferably using one of the above-described methods.

A further object of the present invention is a metal oxide supported gold catalyst, which can be or is produced according to the above-described method. The catalyst of the invention is characterized especially in that the average size of the gold particles on the support is essentially smaller than 10 nm, preferably smaller than or equal to 5 nm, especially preferably from 1 nm to 2 nm.

The catalyst of the invention preferably has a gold ratio of 0.01 wt.-% to 10 wt.-%, preferably 0.01 wt.-% to 2 wt.-%, especially preferably 0.3 wt.-%.

Finally, a further object of the present invention is the use of the aforementioned catalyst of the invention in the oxidation of organic educts, which are especially selected from alcohols, aldehydes and polyhydroxy compounds. According to the invention, the catalyst is preferably used in a heterogeneous catalysis. In other words, the catalyst is present as a solid, whereas the educts to be oxidized are present in a fluid phase, for example as an aqueous solution. The dioxygen that is preferably used for oxidation is then bubbled through the liquid phase as a gas, and is distributed and dissolved in the liquid phase via intensive stirring. The catalyst is preferably used in the form of a powder or granulate. In a further preferred variant, molded articles, such as cylinders, hollow cylinders, spheres or strands, are used.

In a preferred embodiment, an aqueous solution of the educt or educt mixture to be oxidized is produced, which contains the educt at least approximately 10 mmol/l, preferably at least approximately 100 mmol/l, 150 mmol/l, 200 mmol/l, 250 mmol/l, 1.000 mmol/l or 1.500 mmol/l. The aqueous educt solution of the preferably powdered catalyst of the invention is then added in a quantity of approximately 10 mg/l to 10 g/l, wherein approximately 1 g of catalyst per liter is preferably used. Preferably, the ratio of the quantity of educt to be oxidized to the quantity of gold contained on the metal oxide support amounts to at least approximately 300-400,000, preferably at least 300, 500, 1,000, 2,000, 4,000, 10,000, 20,000, 50,000, 100,000, 200,000 or 400,000.

The oxidation of the educt or educt mixture is preferably performed at a pH level from 7 to 11, preferably from 8 to 10. A temperature of 20° C. to 140° C., from 40° C. to 90° C., and especially preferably from 40° C. to 80° C. is preferably used.

The pressure preferably amounts to approximately 1 bar to approximately 25 bar. Preferably, oxygen and/or air is bubbled through the aqueous educt solution of the educt, the mixture or the composition, at a dispersion rate of 100 ml/(min×$L_{reactor\ volume}$) to 10,000 ml/(min×$L_{reactor\ volume}$), preferably of 500 ml/(min×$L_{reactor\ volume}$).

It has been found that, in the gold catalysts of the invention, with the oxidation of aldoses, 100% selectivity for the aldehyde position occurs. The gold catalysts of the invention are thus also suitable for the selective oxidation of carbohydrates. This includes especially the oxidation of an oxidizable aldehyde group on the C1-carbon of a carbohydrate to a carboxyl group, whereas alcohol groups on other carbon atoms of the carbohydrate are not oxidized. As a result, therefore, aldonic acid is preferably obtained. The carbohydrates that are preferably used according to the invention are preferably aldoses, which have an oxidizable aldehyde group on the C1 carbon, or 2-ketoses, in which an oxidizable aldehyde group can be introduced on the C1 carbon atom. With the selective oxidation of the aldehyde group of an aldose, an aldonic acid is obtained. Therefore, with the selective oxidation of a mixture of aldoses, a mixture of different aldonic acids is obtained.

The present invention therefore also relates to the use of the catalysts of the invention to produce an aldonic acid or a mixture of various aldonic acids via the selective oxidation of one or more aldoses with an oxidizable aldehyde group.

The present invention therefore also relates to its use to produce an aldonic acid or a mixture of different aldonic acids using one or more 2-ketoses, wherein the 2-ketose(s) is/are first converted to the tautomeric aldose form(s) with an oxidizable aldehyde group, and is/are then selectively oxidized using the catalyst.

According to the invention, the carbohydrates to be oxidized comprise both monomeric polyhydroxy aldehydes of polyhydroxy ketones, in other words monosaccharides, their dimers to decamers, in other words oligosaccharides and disaccharides, trisaccharides, etc., and the macromolecular polysaccharides. Within the context of the present invention, "monosaccharides" are understood as compounds of the general chemical formula $C_nH_{2n}O_n$ having 3 to 7 oxygen functions, wherein natural monosaccharides are essentially hexoses and pentoses. The carbon chain of a monosaccharide can be unbranched or branched. "Oligosaccharides" refer to compounds that are obtained by combining 2 to 10 monosaccharide molecules, emitting water.

Particularly preferably, the catalyst is used for the selective oxidation of carbohydrates, selected from monosaccharides such as glucose, galactose, mannose, xylose and ribose, and disaccharide aldoses such as maltose, lactose, cellobiose and isomaltose, and disaccharide 2-ketoses such as palatinose, and starch syrup, and maltodextrins, and mixtures of these carbohydrates.

In the oxidation of glucose, using the method of the invention, gluconic acid is obtained as the oxidation product. In the oxidation of galactose, using the method of the invention, galactonic acid is obtained as the oxidation product.

In a further preferred embodiment, the carbohydrate to be oxidized is an oligosaccharide, especially a disaccharide. The disaccharide to be oxidized is preferably a disaccharide aldose such as maltose, lactose, cellobiose or isomaltose. According to the invention, in the selective oxidation of maltose using the method of the invention, maltobionic acid is obtained as the oxidation product. Using the method of the invention, in lactose oxidation, lactobionic acid is obtained as the oxidation product.

In a further preferred embodiment of the invention, the oligosaccharide to be oxidized is a disaccharide ketose. The disaccharide ketose to be oxidized is preferably palatinose (isomaltulose). Prior to oxidation, palatinose is converted according to the invention to the tautomeric aldose form, which is then oxidized.

In a further preferred embodiment of the invention, the carbohydrate to be oxidized is a maltodextrin. Maltodextrins are water-soluble carbohydrates, especially dextrose equivalents, obtained via enzymatic starch degradation and having a chain length of 2 to 30, preferably 5 to 20 anhydroglucose units and a portion of maltose. In the selective oxidation of maltodextrin using the method of the invention, an oxidation product is obtained that, according to the invention, contains an amount of maltobionic acid and gluconic acid, corresponding to the composition, in addition to the oligosaccharide aldonic acids.

In a further preferred embodiment, the carbohydrate to be oxidized is a starch syrup. A starch syrup is understood as a glucose syrup, which is obtained from starch, and is present especially as a purified aqueous solution, wherein the dry weight generally amounts to at least 70%.

In a further preferred embodiment, the carbohydrate to be oxidized is a furfural. The furfural to be oxidized is preferably hydroxymethyl furfural (HMF) or glycosyloxymethyl furfural (GMF).

The invention is specified in greater detail in the following examples and figures, wherein the examples are not intended to limit the invention. Modifications and variations of the invention may be apparent to those skilled in the art upon reading this specification, and can be made without departing from its spirit and scope. The invention is therefore to be limited only by the terms of the claims, along with the full scope of equivalents to which the claims are entitled.

BRIEF DESCRIPTION OF THE DRAWINGS

FIG. 3 shows the long-term stability of the catalyst over 20 "repeated batch" tests.

FIG. 4 shows the effect of different promoting agents on the max. spec. activity of the gold catalysts produced according to the invention.

EXAMPLE 1

Catalyst Production

Support Material

Figure 1:
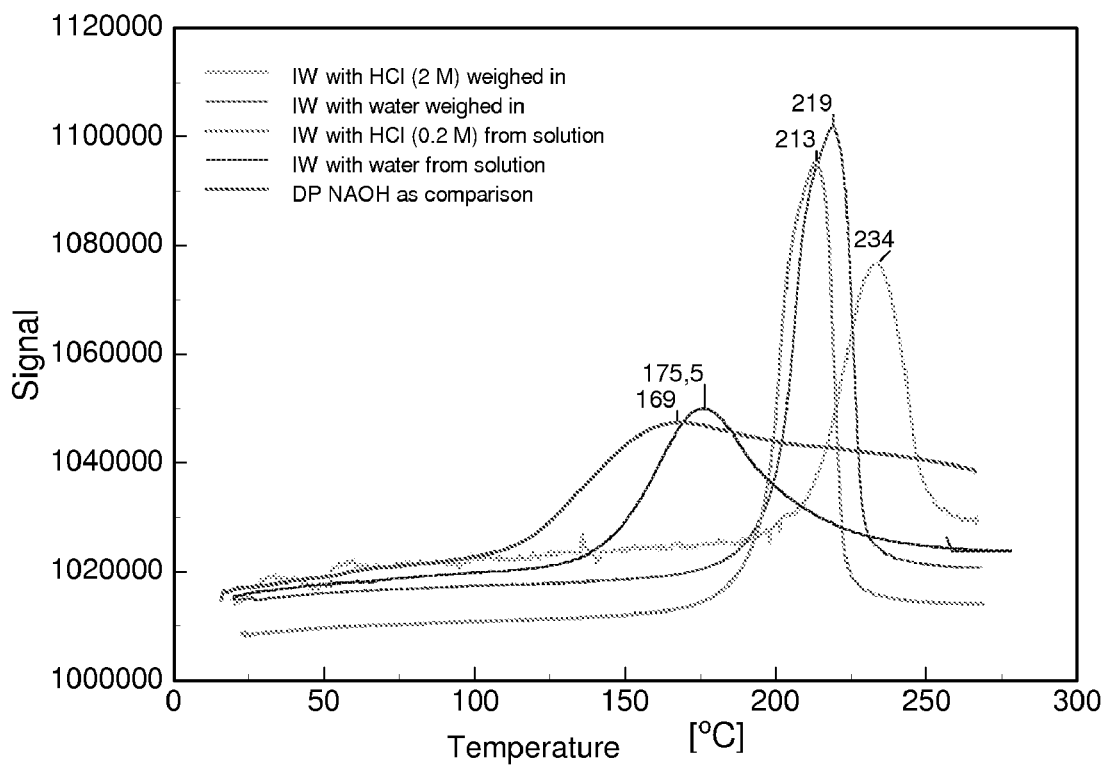
FIG. 1 shows the Temperature-Programmed Reduction (TPR) profiles of the catalysts.

As the support material, by way of example, the aluminum oxides Puralox KR-90 and Puralox SCFa-90, an NaO doped special form (both Sasol company), were used. These have the following parameters:

TABLE 1

| | Puralox SCFa-90, NaO doped | Puralox KR-90 |
|---|---|---|
| Phase | γ/δ phase | δ/τ phase |
| BET surface: | 90-100 m$^2$/g | 90 m$^2$/g |
| Particle distribution: <25 μm | 26.3% | 26.8% |
| <45 μm | 55.8% | 54.0% |
| <90 μm | 99.7% | 95.6% |
| Pore volume: | approx. 0.5 ml/g | approx. 0.8 ml/g |
| Bulk density: | 0.6 g/ml | 0.3 g/ml |
| Na content: | 0.25-0.3% | 0.03% |

Production of the Chloroauric Acid Precursor

The necessary quantity of tetrachloroauric acid in crystalline form (Chempur company (50% Au)) is dissolved in a maximum volume of solvent that corresponds to the pore volume of the quantity of support used.

Various catalysts were produced, in which the precursor $HAuCl_4$ was dissolved in hydrochloric acid, water and potassium hydroxide solution. In addition, an aqueous solution of the precursor (25 g/l Au), stored for an extended period of time, was diluted correspondingly with water and hydrochloric acid. The following batches of chloroauric acid precursor were produced:
1. Precursor weighed in and dissolved in 2 mol/l HCl
2. Precursor solution with 0.2 mol/l HCl diluted from aqueous precursor stock solution
3. Precursor solution weighed in and dissolved in water
4. Precursor solution diluted in water from aqueous precursor stock solution
5. Precursor solution weighed in and dissolved in aqueous KOH In order to obtain catalysts having different gold concentrations, each batch was prepared or diluted multiple times, each time in different chloroauric acid concentrations. Gold catalysts having metal concentrations of between 0.1 and 5% are to be produced. Per batch, 2 g gold catalyst were produced.

Impregnation of the Metal Oxide Support, Incipient Wetness Method

The precursor solutions were added to the support material gradually, dropwise, in separate batches, with simultaneously intensive mixing. The completion of addition can be identified by the onset of moisture of the support material, which indicates the saturation of the pore volume and therefore the limit of the absorption capacity of the support.

Drying, Reduction

The impregnated catalyst precursors were dried overnight in the drying oven (approx. 80° C.) and then reduced for 3 hours at 250° C. in the nitrogen/hydrogen stream (approx. 10% $H_2$). They were then cooled in the nitrogen stream.

Results a) Gold Concentration

With all produced gold catalysts, first the gold concentration is determined via ICP-AES. Gold catalysts having metal concentrations of between 0.1 and 5% were produced. The experimentally determined gold concentrations are compared with the theoretically calculated values.

The correlation between the theoretical gold concentration and the actual gold concentration is excellent in all batches. It was possible to apply the gold to the support without losses.

b) Particle Size

TEM images of the gold catalysts surprisingly show particle sizes of 1 to a maximum of nearly 10 nm.

c) Reduction Temperature

Profiles of the temperature-programmed reduction (TPR profiles) were taken of all catalysts. FIG. 1 shows the TPR profiles of the catalysts. From the TPR profiles, clear differences in the maximum temperatures are apparent. The highest reduction temperature, at 234° C., is exhibited by the catalyst in which the precursor was weighed into a highly acid solution (here: 2 mol/l HCl); the lowest is exhibited by the catalyst in which the precursor solution was diluted with water. From a high reduction temperature, a strong absorption of the gold precursor on the support can be concluded.

EXAMPLE 2

Catalytic Oxidation of Glucose

The catalytic performance of the catalysts produced according to Example 1 was tested in the liquid phase oxidation of glucose to gluconic acid.

The reaction was allowed to run in a tempered glass reactor (volume 500 ml) at 40° C. Gas dispersion was performed through a sintered-glass filter with an oxygen flow rate of 500 ml/min. The initial glucose concentration was 100 mmol/l. The pH level was held constant at pH 9 with the help of a titrator (Titroline alpha, Schott company) and 2 mol/l potassium hydroxide solution. Because gluconic acid is a monocarboxylic acid, at 100% selectivity, the quantity of acid obtained can be derived directly from the volume of hydroxide solution used. Additionally, an inspection was performed using HPLC.

Results a) Selectivity

In this reaction, the gold catalysts produced show 100% selectivity for the aldehyde position of the glucose.

b) Catalytic Activity

The conversion was complete in all reactions (100%). In comparing the catalysts, the maximum, specific activity was examined.

Figure 2:
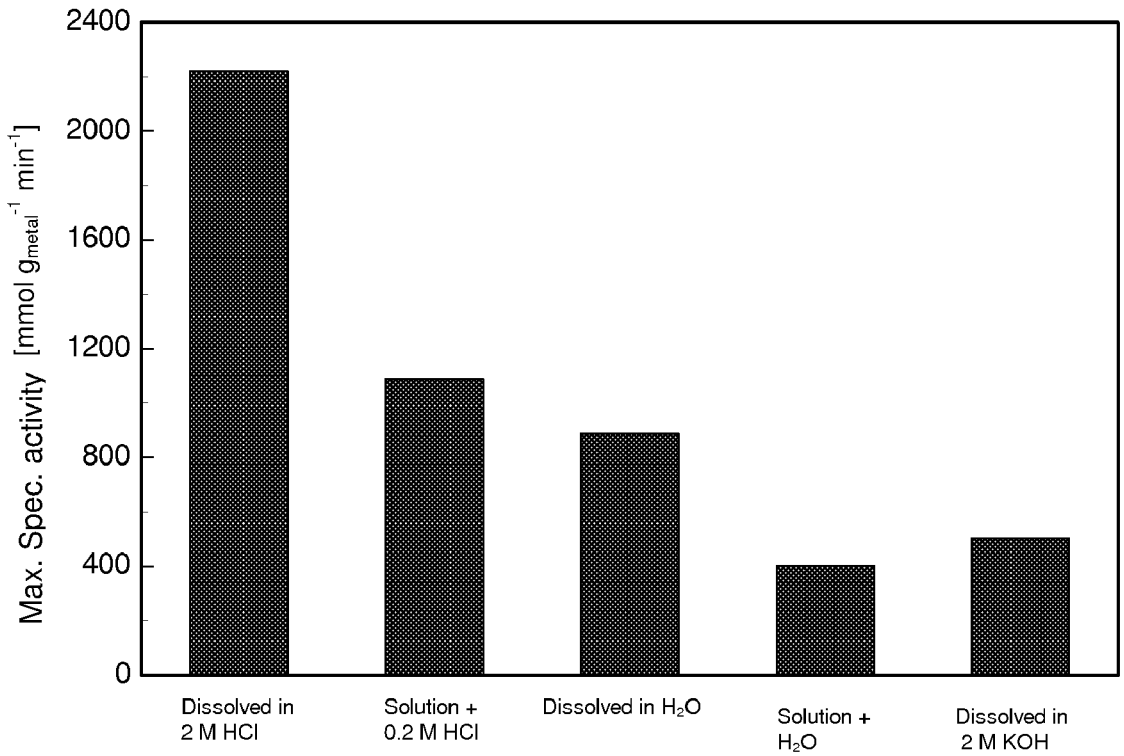
FIG. 2 shows dependence of the activity of the produced catalysts upon the precursor solution used.

FIG. 2 shows the dependence of the activity of the produced catalysts upon the precursor solution that is used. The catalyst for which the precursor was dissolved in a highly acid solution (in this case 2 mol/l HCl) surprisingly exhibits by far the highest activity, of 2,200 mmol glucose/$g_{metal}$ min.

c) Long-Term Stability

A 0.3% Au catalyst was used in 20 "repeated batch" tests without loss of activity. In the examination of long-term stability it was found that the catalysts demonstrate excellent long-term stability. No gold leaching could be observed. The increase in activity as the number of tests increases can be attributed to a decreased oxygen limitation through a loss in catalyst.

EXAMPLE 3

Influence of Promoting Agents

As promoting agents, various alkali, alkaline earth and rare earth metals were used, and their influence on the activity of the gold catalysts produced according to Example 1 was examined.

Puralox SCFa-90 ("undoped" in FIG. 4) and the NaO doped Puralox SCFa-90 ("Sasol doped") in FIG. 4) were used for purposes of comparison.

Results

FIG. 4 shows the influence of different promoting agents on the max. spec. activity of the gold catalysts produced according to the invention, with 0.3 wt.-% gold. The concentration of promoting agent amounts in each case to 0.1 wt.-% of the overall catalyst. Nearly every one of the added promoting agents produced an activity-increasing effect. Sodium, potassium, cesium, calcium and ceroxide, but also $Sm_2O_3$, produced the greatest activity-increasing effect.

COMPARISON EXAMPLE

Au/$TiO_2$ Catalyst with 0.5% Au

Production

A $TiO_2$ hydrate containing anatase (Kronos, $S_{BET}$=288 $m^2$/g) was used as the support material. To an aqueous suspension of 50 g $TiO_2$ in one liter distilled water, which had been heated to 70° C. and adjusted to a pH level of 6.5 using 0.2 N NaOH, 500 mg tetrachloroauric acid ($HAuCl_4 \times 3H_2O$) in 250 ml water are added dropwise at a constant pH level, under intensive stirring, over 3 hours. The batch is stirred for an additional hour at 70° C. After cooling to room temperature, a magnesium citrate solution (2.318 g MgHC$_6$H$_5$O$_7$× 5H$_2$O in 50 ml water), the pH level of which was adjusted previously to 6.5 using 0.2 N NaOH, is added. After 1 hour of stirring, the solid is centrifuged off, washed three times with water, and then dried in a vacuum drying chamber at a pressure of <50 hPa for 17 hours at room temperature, and for 4 hours at 50° C. The precursor that is obtained is lightly triturated and heated in air at a heating rate of 1 K/min to 250° C., and is activated for 3 h at this temperature.

Yield: 47.3 g

TEM: dominant are particles having a diameter of smaller than 5 nm, individual particles having a diameter of approximately 20 nm.

ICP-OES analysis: 0.45%

Glucose Oxidation

The catalyst containing 0.5% Au with a TiO$_2$ support (0.5% Au/TiO$_2$) Type 149 (ACA) was used for the glucose oxidation. Glucose oxidation occurred under the following reaction conditions: Reaction volume (batch): 500 ml, catalyst quantity: 1 g/l, initial substrate concentration: 100 mmol/l, pH level: 9; temperature 40° C., pressure: 1 bar, O$_2$ gas dispersion rate: 500 ml/min, stirring speed: 700 rpm.

Results

| | |
|---|---|
| Glucose conversion: | 100% |
| Maximum specific activity | 416 mmol glucose g$_{metal}^{-1}$ min$^{-1}$ |
| Selectivity to gluconic acid | >99.5% |

The invention claimed is:

1. A method for producing a supported gold catalyst for the oxidation of carbohydrates, from a porous metal oxide support and a chloroauric acid precursor, comprising the following steps:
    a) preparing the support in dried form,
    b) placing the support in contact with an aqueous solution of the chloroauric acid precursor, wherein the maximum volume of the solution is as great as the pore volume of the support, so that an impregnated catalyst precursor is obtained, and
    c) drying the impregnated catalyst precursor,
wherein the predominant form of the chloroauric acid in the aqueous solution of the chloroauric acid precursor is a tetrachloro complex [AuCl$_4$]$^-$, the aqueous solution of the chloroauric acid precursor is a solution in aqueous acid, and the acid concentration of the chloroauric acid precursor solution is at least 2 mol/l or the chloroauric acid precursor solution has a pH of about 1.0 or below.

2. The method according to claim 1, wherein in step b) the aqueous solution of the chloroauric acid precursor is added to the dry support gradually, and only until the support can no longer absorb an additional volume of solution.

3. The method according to claim 1, wherein in an additional step d), a reduction of the catalyst precursor is performed in the hydrogen stream, at temperatures of greater than or equal to 250° C.

4. The method according to claim 3, wherein in step d) the reduction occurs for 10 min to 300 min.

5. The method according to claim 3, wherein in step d) the hydrogen stream contains a hydrogen content of 5 vol. % to 15 vol. %, and optionally contains inert gas.

6. The method according to claim 1, wherein in step c), drying takes place at temperatures of 60° C. to 200° C.

7. The method according to claim 1, wherein the metal oxide support is selected from aluminum oxide, silicon oxide, and titanium dioxide.

8. The method according to claim 1, wherein doping agents, selected from oxides of the alkali metals, alkaline earth metals, and rare earth metals, are added to the support and/or the precursor solution.

9. The method according to claim 1, which comprises performing reduction of the catalyst precursor as a liquid phase reduction.

* * * * *